United States Patent [19] [11] 4,022,354

Kotuby [45] May 10, 1977

[54] ACCUMULATOR RELEASE PUMP

[75] Inventor: Paul M. Kotuby, Naugatuck, Conn.

[73] Assignee: The Risdon Manufacturing Company, Naugatuck, Conn.

[22] Filed: Feb. 17, 1976

[21] Appl. No.: 658,583

[52] U.S. Cl. .................... 222/321; 222/380

[51] Int. Cl.[2] .................... G01F 11/02

[58] Field of Search .......... 222/380, 321, 571, 496; 239/333

[56] References Cited

UNITED STATES PATENTS

| | | | |
|---|---|---|---|
| 1,154,163 | 9/1915 | Ballou | 222/496 |
| 3,023,936 | 3/1962 | Marsh et al. | 222/380 X |
| 3,774,849 | 11/1973 | Boris | 222/321 |

*Primary Examiner*—Stanley H. Tollberg

*Assistant Examiner*—Hadd Lane

*Attorney, Agent, or Firm*—St.Onge Mayers Steward & Reens

[57] ABSTRACT

A finger operated accumulator release pump, adapted to be mounted on a container to dispense liquid therefrom only after the liquid has been pressurized by a predetermined amount, comprises a housing which defines a pump chamber and an inlet to the pump chamber. A conventional check valve prevents return flow of liquid through this inlet. A plunger is telescopically received for reciprocal pumping action in the pump chamber, makes a sliding piston fit with it, and is provided with an outlet passage and a valve seat at the inlet end of the outlet passage. The pressure accumulating release feature of the pump is provided by cooperation of an outlet passage by-pass arrangement and a pressure actuated accumulator valve. The by-pass arrangement comprises a number of by-pass grooves which are disposed in a generally axial direction on the inner surface of the outlet passage at a location intermediate its ends. The accumulator valve member is mounted for reciprocal movement in the outlet passage between a closed position sealed against the inner wall of the outlet passage or against the valve seat and an open position adjacent the by-pass grooves where it permits liquid to be forced through them. A return spring urges the accumulator valve to its closed position. Accordingly, liquid is dispensed by this pump only after liquid in the pump chamber has been pressurized sufficiently to reciprocate the valve member to its open position against the force of the return spring. Further, dispensing stops immediately when liquid pressure drops sufficiently to permit the valve member to again block the by-pass grooves.

8 Claims, 6 Drawing Figures

Fig. 4.
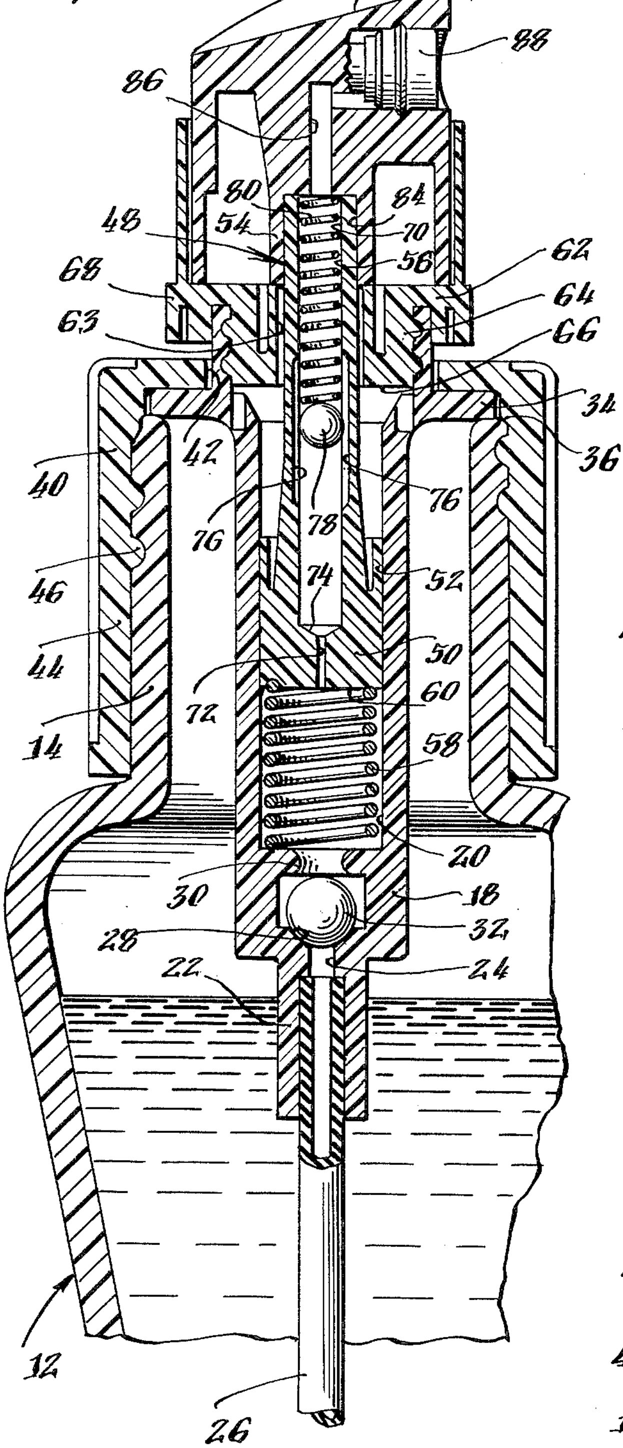
Fig. 5.
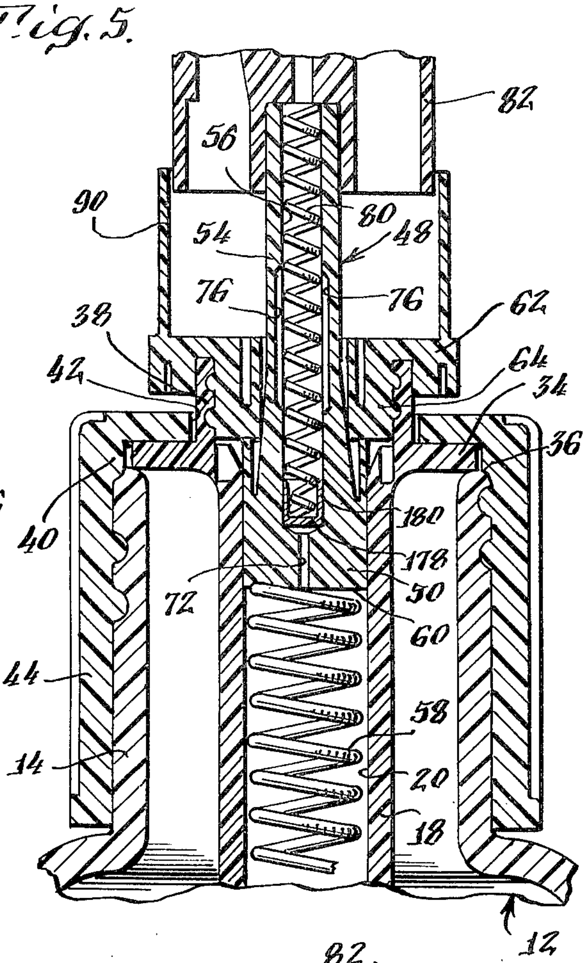
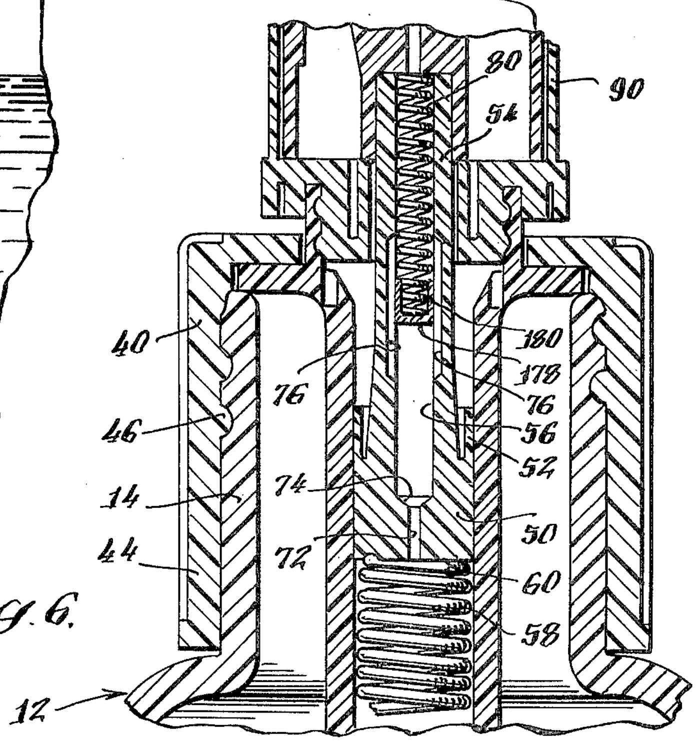
Fig. 6.

ACCUMULATOR RELEASE PUMP

BACKGROUND OF THE INVENTION

1. Field of the Invention

The present invention relates to an finger operable accumulator release pump which dispenses liquid from a container only after the liquid pressure, developed by operation of the pump, exceeds a predetermined value. Further, this pump stops dispensing liquid when the liquid pressure drops below this predetermined value.

Finger operable liquid dispensing pumps are ordinarily adapted to be mounted on hand-held containers of liquid consumer products and to dispense liquid from these containers. It is often desirable to dispense liquid products, such as window and all-purpose cleaners, insecticides, and other household products, or hair sprays, deodorants, colognes and similar personal products as a fine or atomized spray.

2. Description of the Prior Art

Finger operated pumps which dispense liquids from containers as a fine spray are known. However, these pumps have been characterized by certain drawbacks.

Typically, pumps of this kind include a hollow pump housing which receives a plunger arranged to be depressed against the force of a compressed return spring to drive liquid to a nozzle. In order to atomize or break the liquid into many microscopic droplets and, thus, to achieve the fine spray discharge, nozzles have been designed which induce turbulence in the liquid that passes through them. However, when the plunger is depressed too slowly, liquid can be discharged from even a turbulence-inducing nozzle at pressures which are not sufficient to create the desired degree of atomization. And, in fact, liquid may dribble from the nozzle in large drops or in a slow continuous stream that is not atomized at all.

Moreover, slow depression of the pump plunger often fails to sufficiently pressurize the liquid to clear the nozzle after dispensing is complete. Thus, certain of the liquid products above which have a tendency to dry up may clog the nozzle, preventing it from being properly used at a later time.

Various attempts have been made to solve these problems characteristic of finger operable atomizing pumps. For example, U.S. Pat. No. Re. 28,366 (Pechstein) discloses a pump which includes a pump housing having interconnected upper and lower chambers, the upper chamber having a larger diameter than the lower. Separate pistons are reciprocally mounted in each chamber. The lower piston, which has smaller cross-sectional area than the upper piston, is connected through a lost-motion coupling to a valve member which closes an outlet passage disposed through the upper piston and a compressed return spring urges both pistons upwardly to also close the valve member. When the upper chamber is filled with liquid and when the upper piston is depressed, the lower piston is moved downwardly at a faster rate than the upper piston by the fixed volume of liquid which was initially confined in the upper chamber. This effect is due to the different cross-sectional areas of the respective chambers. Liquid is dispensed through the outlet passage only after the lower piston has removed sufficiently to open the valve member through the lost-motion coupling. The liquid is then forced outwardly by the lower piston which is driven upwardly by the return spring.

The pump disclosed in the Pechstein patent is complex and consequently relatively expensive to make. Further, parts including the second piston, the lost-motion coupling, and valve member are added to the typical pump configuration. Therefore, this pump, too, has certain drawbacks.

Other pumps which attempt to remedy the problems of the typical atomizing pump are manufactured by the Nippon Unijet Co., Ltd, Osaka, Japan and are disclosed in U.S. Pat. No. 3,761,022 and Japanese Pat. No. 725,372.

SUMMARY OF THE INVENTION

In a preferred embodiment, to be described below in detail, the finger operable accumulator release pump of the present invention is designed to dispense liquid from a container only after a predetermined pressure has been developed above the liquid. This predetermined pressure is chosen so that complete atomization of the liquid occurs when it is driven through a suitable nozzle such as a turbulence-inducing nozzle. Further, dispensing abruptly stops immediately after pressure above the liquid drops below the predetermined pressure to insure that the nozzle is cleared of excess product.

This accumulator release pump is adapted to be mounted on and to dispense liquid from a hand-held container and includes a housing which defines a pump chamber and an inlet to the pump chamber. A conventional check valve is mounted in the housing inlet to prevent return flow of liquid through it. A plunger, which is reciprocally mounted in the pump chamber for pumping action movement from and to a home position, defines an outlet passage and a valve seat formed on the interior of the inlet end of this outlet passage.

The pressure accumulating operation of the pump of the present invention is provided by cooperation of a by-pass arrangement disposed in the outlet passage of the plunger and a pressure actuated accumulator valve. The by-pass arrangement comprises a number of by-pass grooves which are formed on the inner surface of the outlet passage and extend in a direction generally parallel to the outlet passage axis at a location intermediate the passage ends. In particular, each by-pass groove begins at a point a fixed distance above the inlet end of the outlet passage. The accumulator valve is mounted for reciprocal movement in the outlet passage between a closed position sealed against the inner surface of the outlet passage or against the valve seat and an open position adjacent the by-pass grooves where it permits liquid to flow through them. The accumulator valve, then, operates to seal the outlet passage until adjacent to the by-pass grooves. A return spring urges this valve to its closed position.

Liquid is dispensed from the container by pumping action of the plunger. However, dispensing is delayed until a sufficient predetermined pressure has been developed by the plunger above the liquid in the pumping chamber to force the accumulator valve to its open position adjacent the by-pass grooves. The predetermined pressure is fixed by the spring force of the compressed accumulator valve return spring and by the distance which the accumulator valve must move to reach its open position. Therefore, no matter how slowly the plunger is depressed, liquid discharge only occurs when the predetermined pressure has been developed and the accumulator valve reaches its open position. Similarly, discharge abruptly stops immediately when pressure which tends to move the accumulator valve to its open position is relieved, permitting the valve to be returned by the return spring to a closed position below the by-pass grooves and ultimately to seal against the valve seat. Accordingly, problems of nozzle dribble which normally occur after discharge of the liquid are minimized.

Therefore, it is an object of the present invention to provide a finger operable accumulator release pump which discharges liquid from a container only after a predetermined pressure has been developed above the liquid. Further, this pump is operable to stop discharge as soon as the pressure above the liquid drops below this predetermined pressure.

Other objects, aspects, and advantages of the present invention will be pointed out in or will be understood from the following detailed description provided below in conjunction with the accompanying drawings.

BRIEF DESCRIPTION OF THE DRAWINGS

FIG. 4 is a vertical cross-sectional view of the pump illustrating the plunger depressed to be reciprocated away from its home position and the accumulator valve in its open position.

FIG. 5 is a partial vertical cross-sectional view similar to that shown in FIG. 2 of a second embodiment of the present invention.

FIG. 6 is a vertical cross-sectional view of this second embodiment similar to that shown in FIG. 4.

DETAILED DESCRIPTION OF THE PREFERRED EMBODIMENTS

Figure 1:
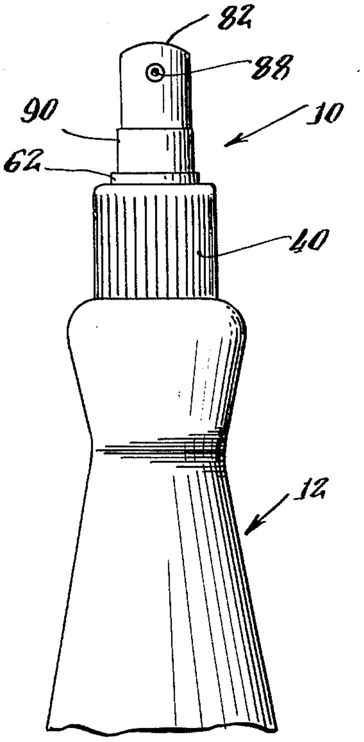
FIG. 1 is a side elevational view of the accumulator release pump of the present invention installed on a container.
Figure 2:
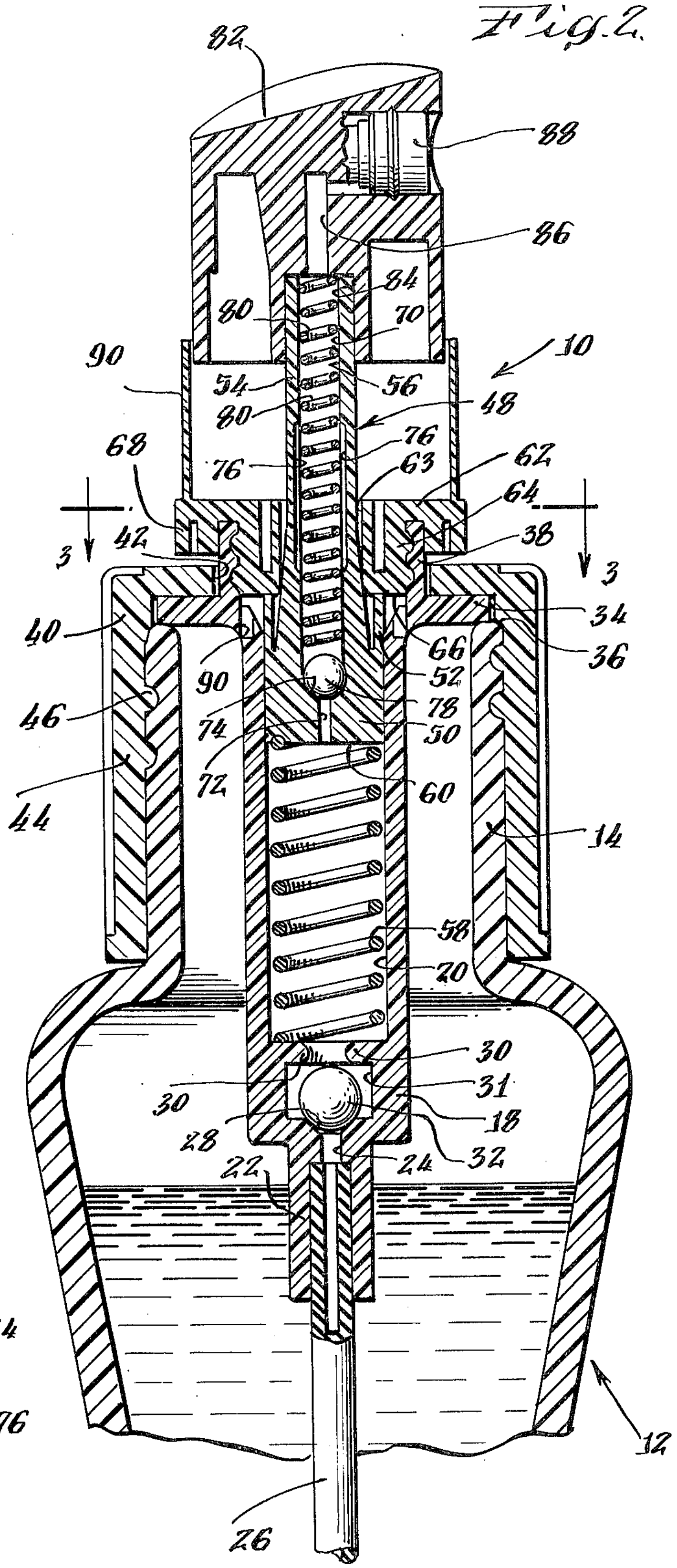
FIG. 2 is an enlarged vertical cross-sectional view of one preferred embodiment of this accumulator release pump shown with the plunger at its home position.

FIGS. 1, 2 and 4 illustrate one embodiment of the accumulator release pump of the present invention, generally indicated at 10, mounted on a container 12. The container, which is adapted to hold a liquid consumer product, may be made of any suitable material such as glass or plastic, can conveniently be held in te user's hand, and has a threaded neck 14 that defines a mouth into which the pump is inserted.

Now referring specifically to FIG. 2, the accumulator release pump 10 includes a hollow cylindrical housing 18 having an inner surface which defines a pump chamber 20. A tailpiece 22 is formed integrally with the lower end of housing 18, and has an inlet passage 24 through it to the pump chamber. Actuation of the pump draws liquid into pump chamber 20 through a dip tube 26, fixed in tailpiece 22, which extends downwardly to the bottom of the container.

Pump housing 18 is also formed at its lower end with a check valve seat 28 and a series of radially inwardly projecting nubs 30 spaced from seat 28 to define an open valve chamber 31. A ball-check valve 32 is confined in chamber 31 and seals against the valve seat 28 to prevent return flow of liquid from the pump chamber in 20 into inlet 24 in a conventional manner.

The pump housing 18 is formed at its upper end with a radially outwardly directed flange 34 which rests upon the upwardly directed shoulder 36 of the container neck 14. A cylindrical collar 38 extends upwardly from flange 34 and a cap 40, which has a central hole 42 sufficiently large to receive collar 38, tightly holds the flange 34 against container shoulder 36. Ordinarily, the interior of the depending cap skirt 44 is provided with molded threads 46 adapted to mate with the threaded neck 14 of the container so that the housing flange 34 can be tightly clamped against shoulder 36 as described above. However, other means of attaching this pump to the container may be substituted for this screw thread arrangement.

The accumulator release pump further comprises a plunger assembly, generally indicated at 48, which is mounted for reciprocal movement to and from a depressed position in housing 18. This plunger assembly includes a piston 50 having a hollow cylindrical skirt 52 and an upwardly projecting, hollow piston rod 54 which defines a cylindrical outlet passage 56. Skirt 52 makes a sliding piston seal with the inner wall of pump chamber 20 in order to effect pumping action when the plunger assembly 48 is depressed in the pump chamber.

The upper end of the pump body 18 is open to receive the plunger assembly 48 and a closure holds this assembly in the body. The closure is in the form of a flanged retainer 62 having cylindrical boss 64 on its lower face that is received in collar 38 to close the upper end of the housing 18. The interengaging surfaces of collar 38 and retainer boss 64 are shaped to form an interlocking snap fit to thus secure retainer 62 in housing 18. The undersurface of retainer 62 then forms a shoulder 66 which stops upward travel of the piston skirt 52 to prevent disengagement of the plunger assembly from the housing. Further, retainer 62 is centrally apertured at 63 to receive piston rod 54.

In addition to holding the plunger assembly in the housing to complete the assembly, the retainer traps the cap 40 between housing flange 34 and an axially outwardly extending flange 68 formed on retainer 62.

A spring 58 is compressed between the bottom face 60 of piston 50 and the radially inwardly directed nubs 30 to urge plunger assembly 48 outwardly of the housing 18 to a home position (FIG. 2) away from the depressed position (FIG. 4).

Figure 3:
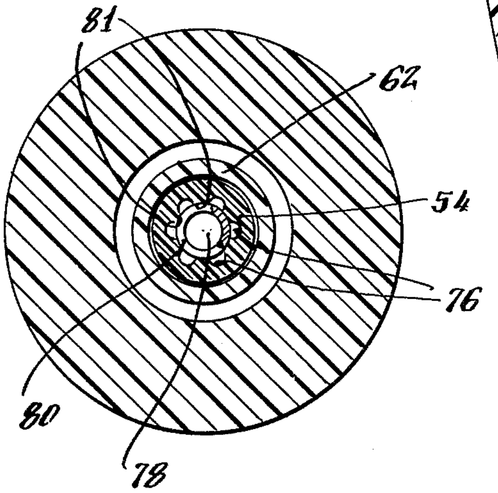
FIG. 3 is a horizontal cross-sectional view taken through plane 3—3 in FIG. 2 looking downward, showing the arrangement of the by-pass grooves.

The liquid pressure accumulating operation of the accumulator release pump of the present invention is provided by the plunger assembly described above, which embodies certain unique features. Specifically, outlet passage 56 is formed with an upper portion 70 of relatively large uniform diameter and a lower portion of smaller diameter forming an inlet port 72 to the upper portion. A valve seat 74 is formed at the transition between these upper and lower outlet passage portions. Further, a series of grooves 76, shown in FIGS. 2, 3 and 4, are disposed to extend in a generally axial direction on the inner surface of the enlarged diameter portion 70 and provide fluid communication which by-passes the outlet passage. An liquid pressure actuated accumulator valve controls fluid flow through the passage 56 and by-pass grooves 76 and may be in the form of a ball 78, having diameter substantially equal to the diameter of upper passage portion 70, which is mounted for reciprocal sealing movement in outlet passage 56 and is urged toward contact with valve seat 74 by a compressed coil spring 80. Accordingly, ball accumulator valve 78 may move upwardly against the force of spring 80 as far as by-pass groove 76 without permitting discharge of fluid. However, once moved to an open position (FIG. 4) adjacent the by-pass grooves, fluid may flow therethrough to be discharged by the pump.

As shown in FIG. 3, the accumulator vaive 78 is properly located with respect to the outlet passage axis by the side wall of the passage and by the elongate lands 81 defined between by-pass grooves 76.

Convenient means for depressing plunger assembly 48 are in the form of an actuator button 82 having a socket 84 on its underface into which the upper end of piston rod 54 is press-fitted to form a liquid-tight seal. Socket 86 communicates through internal feed passages 86 with a discharge nozzle 88 which may be of the tubulence-inducing type. A cylindrical shroud 90 is formed on the upper face of retainer 62 to receive and protect actuator button 82.

Operation of the accumulator release pump 10 may be explained with reference to FIGS. 2 and 4. Initial pumping action of the plunger assembly 48 and, hence, piston 50 draws liquid from the container 12 through dip tube 26 post ball-check valve 32 into the pump chamber 20. During this phase of operation, ball accumulator valve 78 acts as a conventional upper check-valve. Once chamber 20 is filled, subsequent depression of plunger assembly 48 forces liquid upwardly into inlet port 72 to move ball accumulator valve 78 upwardly. However, since the ball seals against the inner surface of the upper portion 70 of outlet passage 56, no liquid is dispensed therethrough. When sufficient pressure has been developed in pump chamber 20 and outlet passage 56 to move ball 78 to its open position (FIG. 4) adjacent by-pass grooves 76 against the compression force of spring 80, liquid passes through the grooves to be discharged through nozzle 88. Accordingly, fluid in pump chamber 20 must first be pressurized a predetermined amount determined by the distance of by-pass grooves 76 about valve seat 74, which determines the distance accumulator valve 78 must travel to reach its open position, and by the spring force of spring 80. The liquid is pressurized by this amount prior to discharge no matter how rapidly or slowly plunger assembly 48 is depressed since the predetermined pressure which must be exceeded is determined by fixed parameters of the pump construction. These parameters are chosen so that the discharge is in the form of a very fine atomized mist.

Similarly, discharge by the pump of the present invention stops immediately when pressure over the liquid drops below the predetermined level. Thus, when depression of plunger assembly 48 stops and no additional pressure is developed above liquid in the pump chamber 20, accumulator valve 78 is returned toward a closed position below the by-pass grooves 76 by spring 80. When the valve blocks the by-pass grooves, liquid discharge stops. This abrupt cut-off of discharge pressure aids in propelling liquid outwardly from nozzle 88 to minimize the amount of residue of liquid which ordinarily would remain about the nozzle to dry and clog it.

The interior of the container is vented during pumping operation to dispense the liquid therefrom in the following manner. Vent ports 90 are formed in the wall of pump housing 18 adjacent flange 34 and open into the space above piston 50 in pump chamber 20. When plunger assembly 48 is in its fully extended or home position, vent passages 90 are cut off from atmosphere by a wedge fit of piston rod 54 with the aperture 63 or by abutment of piston skirt 52 against boss 64. However, when the plunger assembly 48 is depressed, communication with the atmosphere through vents 90 to the interior of container 12 is provided about the periphery of the piston rod 54 in aperture 63.

A second embodiment of the accumulator release pump of the present invention is illustrated in FIGS. 5 and 6 which correspond relatively to FIGS. 2 and 4. This second embodiment includes an accumulator valve in the form of a cup-shaped member 178 having an resilient, upwardly directed, flared skirt 180 which makes a sliding sealing fit with the inner surface of the enlarged diameter outlet passage portion 70. The spring 80 projects into the hollow portion of the cup-shaped member to force it downwardly and to urge the skirt outwardly against the outlet passage walls. This valve member 178 operates in the same manner between open (FIG. 6) and closed (FIG. 5) positions as does the ball valve member 78 described with reference to FIGS. 2 and 4.

Although specific embodiments of the accumulator release pump of the present invention have been disclosed above in detail, it is to be understood that this is only for purposes of illustration. Modifications may be made to the described structures by those skilled in the art in order to adapt these accumulator release pumps to particular applications.

What is claimed is:

1. A finger operable accumulator release pump adapted to be mounted on a container and dispense liquid therefrom when a predetermined pressure is developed above the liquid by finger operation of said pump, said pump comprising:

A. a housing defining
  1. a pump chamber; and
  2. an inlet to the pump chamber;

B. check valve means located in said housing inlet to prevent return flow of liquid therethrough;

C. a plunger telescopically received for reciprocal movement from and to a home position in said pumping chamber and making a sliding piston fit therewith, reciprocation of said plunger from home position developing pressure above the liquid, said plunger having
  1. an outlet passage therethrough having an axis and substantially uniform cross-sectional size and shape;
  2. at least one by-pass groove extending in the general direction of the outlet passage axis along the inner surface of and intermediate the ends of said outlet passage;
  3. at least one land defined by the inner surface of said plunger outlet passage adjacent said by-pass groove at the same location therewith relative to the outlet passage axis;

D. pressure actuated accumulator valve means mounted for reciprocal movement in said outlet passage, guided by the inner surface of said outlet passage and said land, to
  1. close said by-pass groove when said plunger is at its home position and said accumulator valve is at one extreme of its reciprocal travel; and
  2. open said by-pass groove when the predetermined pressure is developed by reciprocation of said plunger from its home position to reciprocate said accumulator valve means a predetermined distance from said one extreme to a position adjacent said by-pass groove and land; and E. means for urging said accumulator valve means to said one extreme of its reciprocal travel.

2. The finger operable accumulator release pump as claimed in claim 1 further comprising:

a plurality of by-pass grooves circumferentially separated by a plurality of lands.

3. The finger operable accumulator release pump as claimed in claim 2 wherein said accumulator valve means comprises:

a valve member formed to make a sliding, sealing fit with the inner surface of said plunger outlet passage, said valve member opening said by-pass groove when moved adjacent thereto and closing said by-pass groove and outlet passage when not adjacent to said by-pass groove.

4. The finger operable accumulator release pump as claimed in claim 3 wherein said plunger outlet passage is cylindrical and wherein said valve member is a ball valve having diameter sufficient to make a sliding sealing fit with the interior of said outlet passage.

5. The finger operable accumulator release pump as claimed in claim 3 wherein said plunger outlet passage is cylindrical and wherein said valve member is a resilient cup-shaped element having a flared skirt which makes a sliding sealing fit with the inner cylindrical surface of said outlet passage.

6. A finger operable accumulator release pump adapted to be mounted on and to dispense liquid from a container, said pump comprising:

A. a housing defining
   1. a pump chamber; and
   2. an inlet to said pump chamber;

B. check valve means mounted in said housing inlet to prevent return flow of liquid therethrough;

C. a plunger telescopically received for reciprocal movement from and to a home position in said pump chamber, making a sliding piston fit therewith and defining
   1. an outlet passage therethrough;
   2. a valve seat formed at the inlet end of said outlet passage; and
   3. at least one by-pass groove formed to extend in a generally axial direction on the inner surface of said outlet passage at a location intermediate its ends;
   4. at least one land defined by the inner surface of said plunger outlet passage adjacent said by-pass groove at the same location therewith relative to the outlet passage axis;

D. an accumulator valve member mounted for reciprocal sealing movement in said outlet passage, guided by the inner surface of said outlet passage and said land, between
   1. a closed position not adjacent said by-pass groove; and
   2. an open position adjacent said by-pass groove and said land permitting liquid to flow through said groove; and E. means for urging said valve member to its closed position.

7. The finger operable accumulator release pump as claimed in claim 6 wherein said plunger outlet passage is cylindrical and wherein said drive member is a ball valve having diameter sufficient to make a sliding piston fit with the inner wall of said outlet passage.

8. The finger operable accumulator release pump as claimed in claim 6 wherein said plunger outlet passage is cylindrical and wherein said valve member is a resilient cup-shaped element having a flared skirt which makes a sliding sealing fit with the inner cylindrical surface of said outlet passage.

* * * * *